United States Patent [19]
Okada

[11] Patent Number: 6,092,005
[45] Date of Patent: Jul. 18, 2000

[54] VEHICLE DRIVING CONDITION PREDICTION DEVICE AND WARNING DEVICE

[75] Inventor: Akio Okada, Mishima, Japan

[73] Assignee: Toyota Jidosha Kabushiki Kaisha, Toyota, Japan

[21] Appl. No.: 08/892,069

[22] Filed: Jul. 14, 1997

[30] Foreign Application Priority Data

Jul. 15, 1996 [JP] Japan ................................. 8-184355
Aug. 29, 1996 [JP] Japan ................................. 8-228880
May 21, 1997 [JP] Japan ................................. 9-130815

[51] Int. Cl.[7] .............................. G06F 17/00; B60T 8/24
[52] U.S. Cl. .............................. 701/1; 340/439; 340/905; 701/70; 701/72
[58] Field of Search ................................. 701/1, 36, 70, 701/71, 72, 200, 207, 208; 340/901, 905, 438, 439

[56] References Cited

U.S. PATENT DOCUMENTS

| | | | |
|---|---|---|---|
| 5,315,295 | 5/1994 | Fujii | 701/93 |
| 5,335,176 | 8/1994 | Nakamura | 701/45 |
| 5,485,381 | 1/1996 | Heintz et al. | 340/936 |
| 5,539,397 | 7/1996 | Asanuma et al. | 340/901 |
| 5,546,311 | 8/1996 | Sekine | 701/208 |
| 5,661,650 | 8/1997 | Sekine et al. | 701/82 |
| 5,748,476 | 5/1998 | Sekine et al. | 701/93 |
| 5,832,400 | 11/1998 | Takahashi et al. | 701/53 |

FOREIGN PATENT DOCUMENTS

| | | |
|---|---|---|
| 0 543 543 | 5/1993 | European Pat. Off. . |
| 44 38 662 | 5/1995 | Germany . |
| 4-184215 | 7/1992 | Japan . |
| 4-351913 | 12/1992 | Japan . |
| 5-141979 | 6/1993 | Japan . |
| 2 276 452 | 9/1994 | United Kingdom . |
| 2 283 353 | 5/1995 | United Kingdom . |

OTHER PUBLICATIONS

The 2nd. Transportation and Logistics Conference, Dec. 6, 1993, A Study of Self–reliant cornering Speed control system, Kazuya Tamura et al, pp. 178–183, Abstract.

*Primary Examiner*—William A. Cuchlinski, Jr.
*Assistant Examiner*—Edward Pipala
*Attorney, Agent, or Firm*—Pillsbury Madison & Sutro LLP

[57] ABSTRACT

A vehicle driving condition prediction device, a warning device using this prediction device, and a recording medium for storing data for prediction, wherein during use of the prediction function of an approach speed of the vehicle to a curve ahead, the acceleration at the present moment is maintained for a condition maintaining period of time, and thereafter the vehicle speed is slowed down at a fixed deceleration, and using such an assumed deceleration pattern a vehicle speed in future is predicted, by which a warning can be given taking the chances of driver's deceleration into consideration.

12 Claims, 7 Drawing Sheets

VEHICLE DRIVING CONDITION PREDICTION DEVICE AND WARNING DEVICE

BACKGROUND OF THE INVENTION

1. Field of the Invention

The present invention relates to a vehicle driving condition prediction device for predicting the lateral acceleration which will occur when passing through a curve ahead, and to a vehicle driving condition warning device for producing a warning when a predicted lateral acceleration exceeds a specified reference value.

2. Discussion of Related Art

Such automobile navigation system is well known which provides route guidance for the driver of a vehicle. The navigation systems are being installed in an increasing number of vehicles. The navigation system stores road map data, including road shapes and monitors the present position of the vehicle. Therefore, it is possible for the system to recognize that there is a curve ahead before entering the curve. It has been proposed to optimize the vehicle speed when going into a curve using the navigation system. For example, in Japanese Patent Laid-Open Publication No. 5-141979 (JP-A-05141979), the lateral acceleration G while driving through a curve is calculated from the radius of curvature R of the curve ahead and the present vehicle speed. The calculated lateral acceleration G is compared with a predetermined reference value G0. If the lateral acceleration G exceeds the reference value G0, a decision is made at the vehicle should slow down, and a warning is issued.

As the driver reduces the speed in response to the warning, the vehicle speed while entering the curve can be optimized, so that the vehicle can pass through the curve stably.

However, the problem with the above warning system is that a curve warning is troublesome because it is issued even when driving at a safe speed. Further, with other conventional warning devices, a warning tends to be issued when the driver was planning to reduce the speed even without the warning.

SUMMARY OF THE INVENTION

The object of the present invention is to provide a vehicle driving condition prediction device capable of predicting a suitable lateral acceleration, and a vehicle driving condition warning device capable of issuing a suitable warning using acceleration predictions.

According to the present invention, the vehicle driving condition prediction device predicts a lateral acceleration of the vehicle which will occur when the vehicle is going into a curve ahead. This prediction device predicts an approaching vehicle speed at a curve approach point based on a predetermined acceleration/deceleration pattern, and predicts a lateral acceleration in a curve from a predicted approaching vehicle speed In the present invention, there is provided a predetermined acceleration/deceleration pattern, according to which the vehicle speed when entering a curve in the road is predicted. Therefore, instead of merely maintaining the present vehicle speed, by predicting the action that the driver will take, based on the present operating conditions, a vehicle speed when the vehicle enters a curve in front of the vehicle can be predicted. For example, since a prediction is made as to the deceleration that the drive will carry out, the system will avoid issuing a warning about a curve that the driver is aware of and already planning on reducing the speed in preparation of entering the curve, such warnings are bothersome.

The above-mentioned predetermined acceleration/deceleration pattern is formulated by taking into consideration the driving condition at the in time of the prediction. For example, by setting conditions so that the present acceleration or deceleration is maintained for a specified period of time, it becomes possible to make a prediction for the vehicle speed by taking the present driving condition into account. Thus, a suitable curve approach speed can be predicted.

The above-mentioned predetermined acceleration/deceleration pattern also takes the longitudinal slope of the road into account. The road inclination directly affects the variation in the longitudinal speed of the vehicle in the short-term future, and this speed variation in turn affects the centrifugal force when turning through the curve. Whether or not turning through a curve can be done stably is evaluated by comparison between the frictional force of the tire with the road surface and the centrifugal force of the vehicle. Therefore, by taking the road longitudinal slope into consideration, more suitable conditions by which to issue a warning can be set.

The above-mentioned predetermined acceleration/deceleration pattern is such that the present driving condition is maintained for a specified period of time, and then the vehicle speed is reduced by a specified deceleration. In this way, the time for which the present driving condition is maintained is limited to a finite period of time. Thus, by adequately considering possibilities that the driver may decrease the speed, for example, the acceleration/deceleration pattern can be approximated to the actual operation by the driver.

As data related to the roads, there is provided a data base including data on the curvatures of the curves and data on the road crossfalls or cant. Based on both the curvature of the curve ahead and the road cant included in the database, the above-mentioned lateral acceleration is predicted. Thus, by taking the road cant into account, appropriate prediction of the lateral acceleration can be carried out.

The present invention is characterized in that the speed limit of the road on which the vehicle is running is considered in the predetermined acceleration/deceleration pattern. The drivers are aware of the speed limits of ordinary roads, and probably drive at speeds close to the speed limits particularly when traveling through curvy roads. Therefore, by assuming that the driver drives at the speed limit and also arranging for a warning to be issued when the driver must not continue to drive as fast as this and must slow down, a warning can be given appropriately.

DETAILED DESCRIPTION OF THE INVENTION

A preferred embodiment of the present invention will be scribed with reference to the accompanying drawings.

GENERAL COMPOSITION

Figure 1:
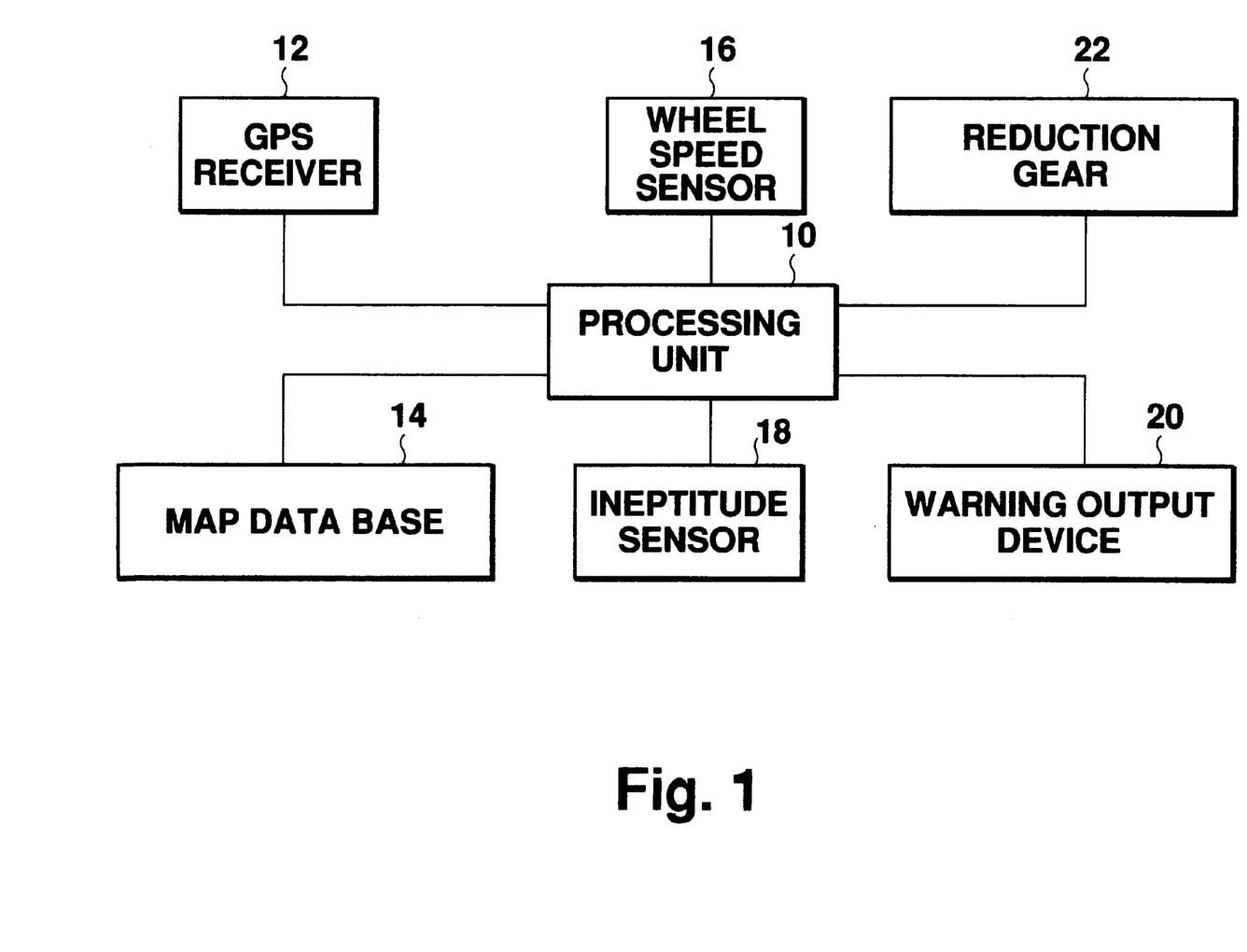
FIG. 1 is a block diagram showing the general composition of an embodiment of the present invention.

FIG. 1 is a block diagram showing the general composition of an operation support device according to this embodiment. A processing unit 10 performs arithmetic operations on various kinds of input signals and outputs various control signals.

A GPS receiver 12 receives radio waves from artificial satellites and performs a GPS (Global Positioning System) process to detect the present position of the vehicle, and send a present position signal to the processing unit 10. This embodiment utilizes DGPS (Differential GPS) to receive error GPS information by FM multiplex broadcasting to improve the accuracy of present position detection. Accordingly, it is possible to detect the present position of the vehicle with an accuracy of 2 to 3 meters or less.

A map data base 14 includes map information for ordinary navigation. This map data base 14 includes X and Y coordinates, curvatures of curves, road surface cants and longitudinal slopes of specified map points (at proper intervals on the road), and further an ineptitude flag as to whether or not slowdown is required at respective points. The map data base 14 supplies the processing unit 10 with those items of data as functions of vehicle position at present and in the future.

A wheel speed sensor 16 detects the rotation of the drive axle by an optical or magnetic method, and generates pulse signals according to the number of revolutions of the wheels. In this example, the wheel speed sensor 16 detects the number of revolutions of the left and right front wheels, respectively. The processing unit 10 detects state quantities of vehicle movements, such as the vehicle speed and acceleration from output of the wheel speed sensor 16. It will be much better if an acceleration sensor is provided separately for longitudinal and lateral acceleration and the accuracy of each sensor as well as results of arithmetic operations are checked and corrections are made when necessary.

An ineptitude sensor 18 comprises a rain drop sensor, a wiper switch, and an image pickup device, and supplies the processing unit with an ineptitude flag representing the ineptitude level of driving in terms of the dampness and the like of the road surface.

The processing unit 10 predicts the vehicle speed, position lateral acceleration, and so on at instants in the short-term future from the road shape, present position, vehicle speed, and so on. Note that the processing unit 10 uses the ineptitude flag for control of the lateral acceleration.

The processing unit 10 is connected with a warning output device 20, and a reduction gear 22. The warning output device 20 includes a speaker for sound output, a buzzer, an LED (light emitting diode), a display or the like, and outputs a warning directing the driver to decelerate. The display also presents information for navigation. The reduction gear 22 includes a throttle actuator, a speed change actuator, a break actuator, etc. to control the deceleration of the vehicle.

GENERAL OPERATION

Figure 2:
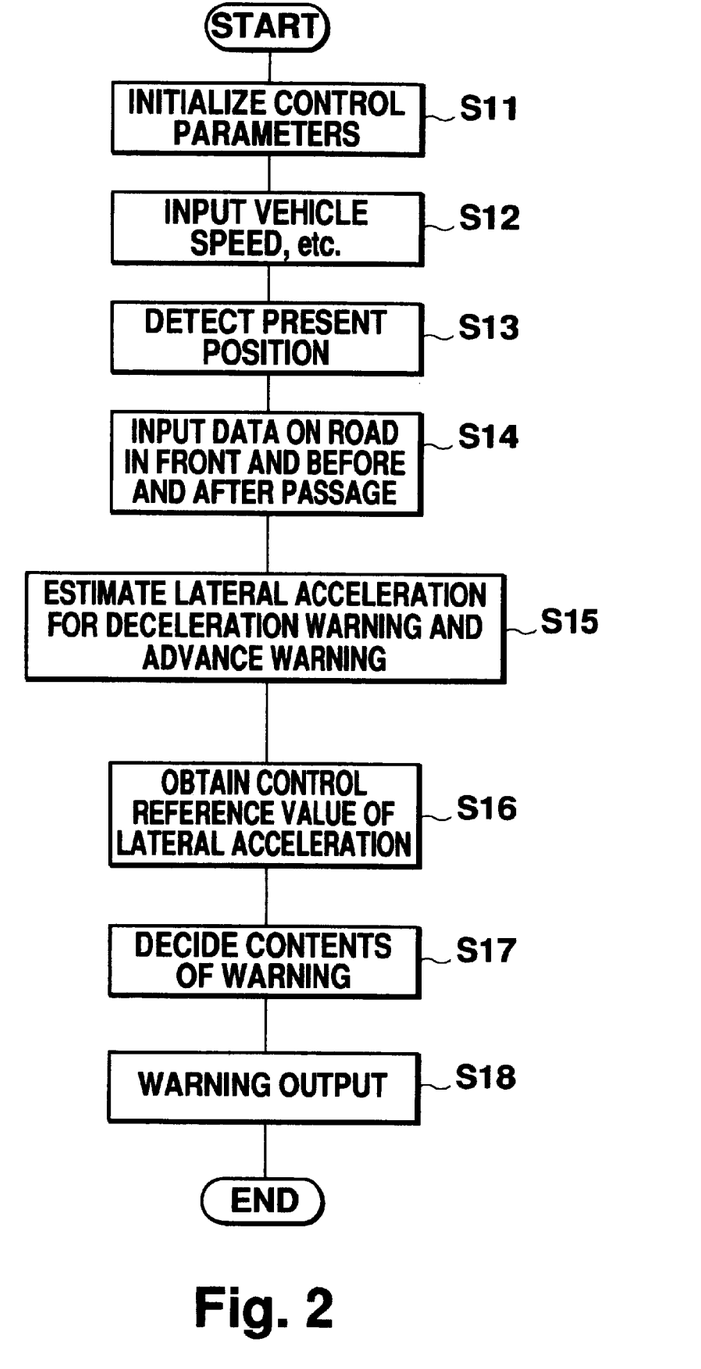
FIG. 2 is a flowchart showing the processing actions for warning output.

The general flow of control procedure of warning output in this embodiment will be described with reference to FIG. 2. When the engine is started, the processing unit 10 is activated to start processing.

The processing unit 10 sets various control parameters (flags) to initial values (S11), then receives vehicle state quantities from the wheel speed sensor 16 (S12) and the present position from the GPS receiver 12. (S13) The processing unit 10 also receives information about present position and data on the shape of the road in front of the vehicle from the map data base 14. (S14)

If the present vehicle condition and the shape of the road ahead are obtained, a lateral acceleration is hereafter predicted for an advance warning and a warning directing the driver to decelerate. (S15) Calculation of the lateral acceleration will be described later. Next, a lateral acceleration which would allow stable driving at each point on the road is calculated, that is to say, a control reference value as the basis for control. (S16) The control reference value is decided by the frictional force between the road surface and the tire. As will be discussed later, the control reference value is corrected according to the paved condition of the road and the clear visibility ahead stored in the map data base 14 and the dampness of the road surface obtained by the ineptitude sensor 18.

The control reference value of the lateral acceleration obtained as described is compared with the predicted lateral acceleration obtained for an advance warning and a warning to direct the driver to decelerate, a decision is made about the necessity of an advance warning and a warning for deceleration, and the kind of warning to be issued is decided. (S17) The processing unit 10 controls the warning output device 20 and the reduction gear 22 to output a decided warning (S18).

LATERAL ACCELERATION PREDICTION

Description will now be given of the prediction of lateral acceleration in S15. The processing unit 10 receives state quantities of the vehicle movements, such as present vehicle speed, individual wheel speeds, individual wheel accelerations, and so on through the wheel speed sensor 16 from the vehicle side, and receives longitudinal slope data from the map data base 14. From those items of data and the assumed deceleration pattern that simulated the deceleration behavior of the driver, future vehicle movements (vehicle speed and position) are predicted by solving an equation of motion.

Assumed Deceleration Pattern

Figure 3:
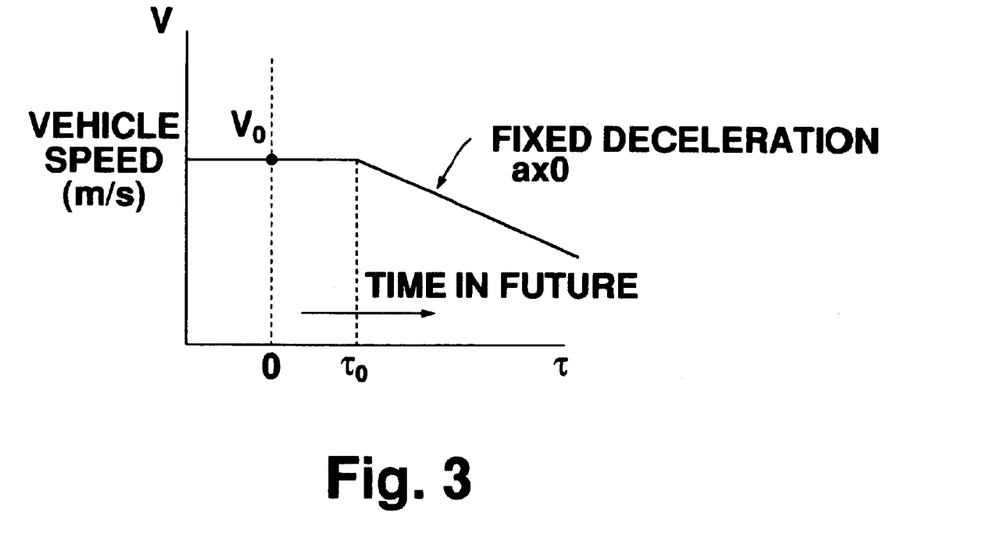
FIG. 3 is a diagram showing an example of an assumed deceleration pattern.
Figure 4:
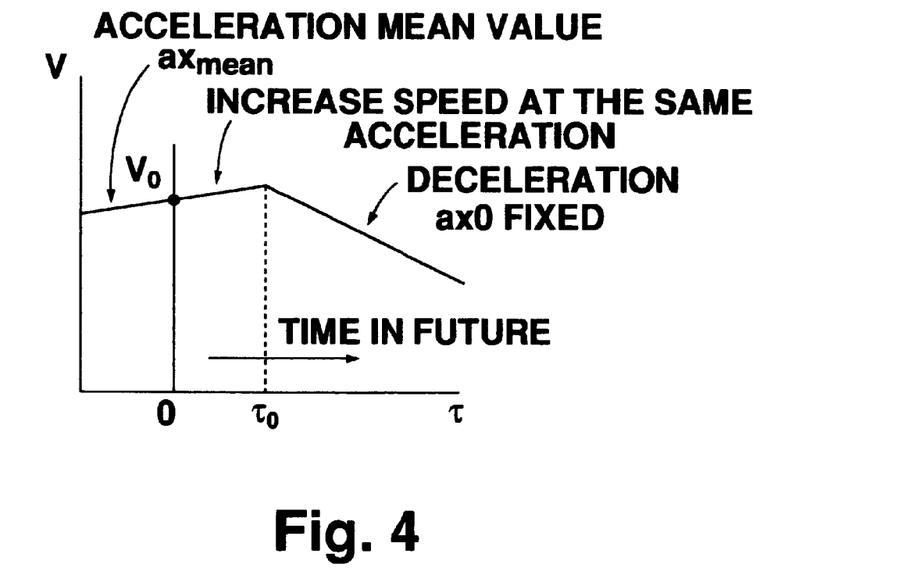
FIG. 4 is a diagram showing another example of an assumed deceleration pattern.
Figure 5:
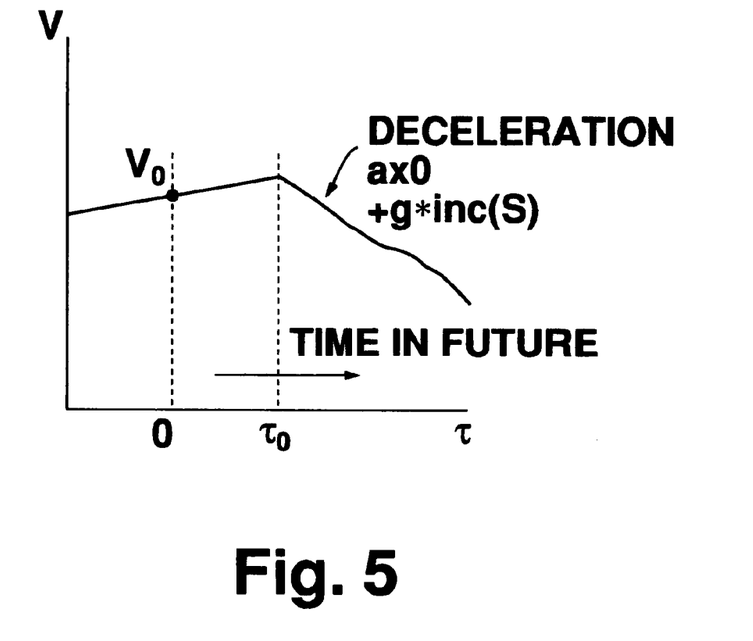
FIG. 5 is a diagram showing yet another example of an assumed deceleration pattern.

The assumed deceleration pattern will be explained to begin with. This assumed deceleration pattern supposes that the present acceleration or deceleration state is maintained for a period of $\tau 0$ sec from this very moment, and after $\tau 0$ the brake is applied to decelerate the vehicle at a fixed deceleration ax0. This example is illustrated in FIGS. 3 to 5. FIG. 3 shows a case where the vehicle is running at a fixed speed of V0, and for a period of $\tau 0$ from this very moment the vehicle runs at the same speed, then the vehicle is slowed down at a fixed deceleration of ax0. This ax0 has only to be set at 0.2 G or so, for example, and may be changed if it is necessary.

FIG. 4 shows a case where at this very moment the vehicle is being accelerated at a mean value of acceleration of $ax_{mean}$. In this case, acceleration is continued at $ax_{mean}$ until $\tau 0$, and thereafter, the vehicle is decelerated at ax0.

FIG. 5 shows a case where acceleration at this very moment is $ax_{mean}$ like in FIG. 4, and takes the longitudinal slope inc (S) into consideration, in which case S denotes a distance in the advancing direction of the vehicle from the present position, inc (S) denotes the inclination at each position on the road, and g denotes the gravitational acceleration, so that g×inc(S) is the acceleration in the advancing direction of the vehicle at each point along the road.

If this assumed deceleration pattern is used, the vehicle speed $V(\tau)$ after $\tau$ sec from this moment and the moved distance $S(\tau)$ from the present position are obtained by solving the following differential equation. Suppose that in deceleration after $\tau 0$, a braking force Fb=m×ax0 is applied, if the mass of the vehicle is designated by m, regardless of the inclination.

$$\left.\begin{aligned}\frac{d^2 S(\tau)}{d\tau^2} &= ax_{mean} \quad (0 \leq \tau \leq \tau_0) \\ &= -ax0 \quad (\tau_0 < \tau)\end{aligned}\right\} \quad (1)$$

$$\frac{dS(\tau)}{d\tau} = V(\tau) \quad (2)$$

where $ax_{mean}$ denotes the mean vehicle speed for a period before t=0, and is calculated from a mean value of acceleration of the left and right front wheels. As mentioned above, ax0 is a fixed deceleration. The initial conditions of the above equation are V=V0 and S=0 when t=0.

When the road has a longitudinal slope, the inc(S) at every point along the road needs to be input, to obtain an equation of motion, and it is necessary to add g×inc(S) to the right-hand side of the above equation. Note that in a road division where $\tau \leq \tau 0$, the effect of the inclination is included in $ax_{mean}$. Therefore, only for a road division where $\tau > \tau 0$, is it necessary to take the effect of the longitudinal slope into consideration. (Refer to FIG. 5.)

Figure 6:
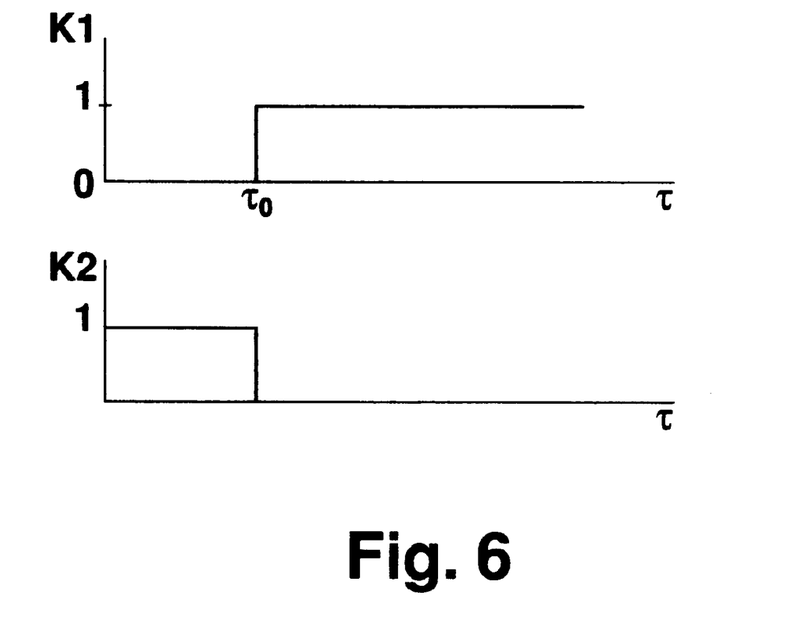
FIG. 6 is an explanatory diagram of weighting functions.

As weighting functions with respect to $\tau$, $K1(\tau)$ and $K2(\tau)$ are defined by the following equations.

$K1(\tau)=0 (0<=\tau<\tau 0)$ $K1(\tau)=1 (\tau>=\tau 0)$ $K2(\tau)=1-K1(\tau)$ $K1(\tau)$ and $K2(\tau)$ in the above equations are illustrated in FIG. 6.

Therefore, the equations (1) and (2) can be expressed as shown below.

$$\frac{d^2 S(\tau)}{d\tau^2} = K1(\tau)*ax_{mean} - K2(\tau)*ax0 - K1(\tau)*g*inc(S) \quad (3)$$

$$\frac{dS(\tau)}{d\tau} = V(\tau) \quad (4)$$

By solving the equations (3) and (4), the vehicle speed $V(\tau)$ and the moved distance $S(\tau)$ according to the assumed deceleration pattern can be obtained.

In this embodiment, so as to be compatible with various deceleration models, the respective terms on the right-hand side of the equation (3) are multiplied by parameters FK1, FK2 and FK3 in advance. Consequently, if "1" is set for a certain parameter, that parameter is 100% taken into consideration, or if "0" is set, that parameter is disregarded completely.

As a result, it follows that the assumed deceleration pattern is expressed by five parameters, FK1, FK2, FK3, $\tau 0$, and ax0.

In view of the characteristics of ordinary drivers, approximate values which should desirably be set are FK1, FK2 and FK3=1.0, 0=0.5–1.5sec, and ax0=2–3 m/sec². However, by varying the values of the parameters according to the object of control, suitable behavior of the vehicle can be predicted.

By solving the above equation of motion, obviously the vehicle is bound to come to a stop at a given time ahead, so that it is possible to stop calculation there and set $V(\tau)=0$ and $S(\tau)$=constant hereafter.

Consideration of Cant of the Road

Figure 7:
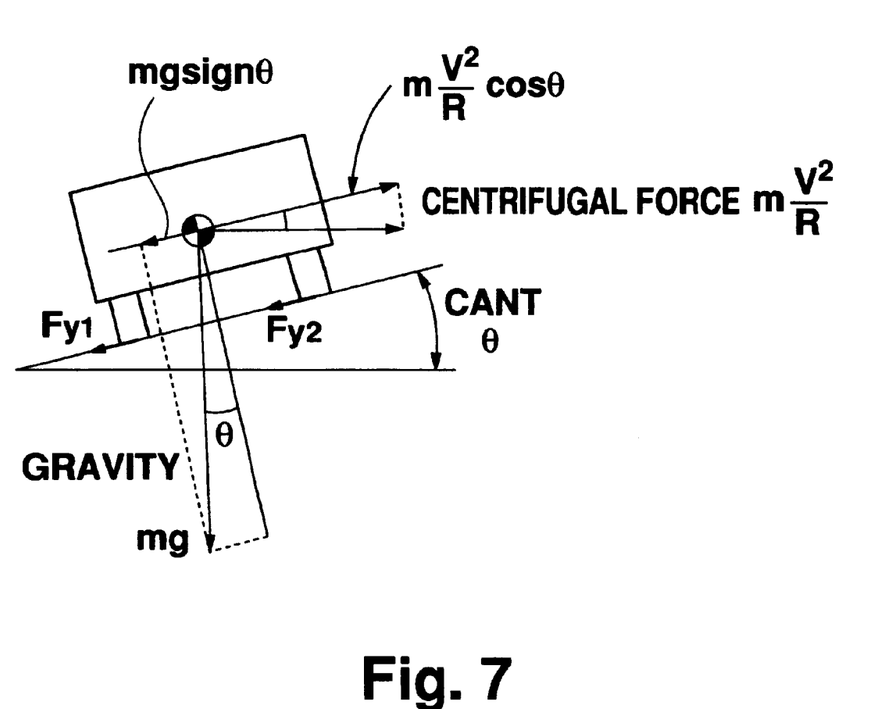
FIG. 7 is a diagram showing the balance of forces acting on the vehicle.

The balance of forces acting on the vehicle when turning through the curve with a cant is as illustrated in FIG. 7. Specifically, the centrifugal force acting on the vehicle is $mV^2/R$ (m is the mass of the vehicle, V is the vehicle speed, R is the curve radius (the curvature of 1/R is stored in the map data base)), and the cant is $\theta$, and therefore the lateral force acting on the vehicle, Fy, (parallel with the road surface) is $m(V^2/R) \cos \theta - m g \sin \theta$.

Therefore, the lateral acceleration of the vehicle is expressed as $(V^2/R) \cos \theta - g \sin \theta$. If the roll angle attributable to the deflection of the suspension of the vehicle body is neglected, this corresponds to the reading of a lateral accelerometer and, in other words, corresponds to the lateral acceleration that the driver feels.

If this lateral acceleration is designated by ayh ($\tau$) as a function of $\tau$, the ayh ($\tau$) is expressed as $ayh(\tau)=(V^2(\tau)/R(\tau)) \cos \theta - g\sin \theta(\tau)$ (5)

Meanwhile, the vertical drag N is expressed as $N=m(V^2/R) \sin \theta + m g \cos \theta$. Therefore, in order to turn through a curve, it is required for the following equation to hold.

$$\frac{F_Y}{N} = \frac{\frac{V^2}{R}\cos\theta - g*\sin\theta}{\frac{V^2}{R}\sin\theta + g*\cos\theta} \leq \mu \quad (6)$$

The left-hand side of this equation increases sharply as V increases, and there is a value of V such that the left-hand side=$\mu$. Therefore, if V is obtained by this equation supposing the left-hand side=$\mu$, this V is the maximum vehicle speed at which the vehicle can run through a curve, in other words, the critical vehicle speed.

In this case, the cant $\theta$ of the road surface is generally 0.1 rad (about 5.7°) or less, and the first term in the denominator is 1/10 or less of the second term. Therefore, the vertical draft (denominator) hardly changes with the vehicle speed. For this reason, the harshness of turning while driving through a curve can be substantially evaluated by the magnitude of the acceleration ayh of the numerator. To be more specific, as the value of the acceleration ayh approaches $\mu$g, turning becomes unstable. Therefore, the control reference value is set at avalue sufficiently smaller than $\mu$g.

Whether it is possible to make a stable turn through a curve may be decided according to the maximum value of the lateral acceleration ayh ($\tau$) regardless of a left turn or right turn. It is required that the maximum value of |ayh ($\tau$)| does not exceed the control reference value for a road division as the object of measurement on the road ahead. Therefore, the maximum value ayhmax of |ayh ($\tau$)| is obtained and taken as abasis on which to decide whether or not the vehicle is in a condition suitable for curve driving. A road division for measurement is a division of $\tau$min $<=\tau<=\tau$max in terms of time or V0×$\tau$min$<\tau$=V0×$\tau$max in terms of distance. This $\tau$min and $\tau$max are set at a suitable value based on survey by actual driving, and may be about 2 to 10 sec, for example.

Time τ0 for maintaining the present acceleration or deceleration is decided by considering the time required for the driver to switch over from the accelerator pedal to the brake pedal and so on. In this decision, the points on the road where the speed is reduced should be considered by recognizing the locations of the curves by actual driving on the road. Since the effect of the present driving condition at this very moment is limited up to a finite time τ0 as described above, assumed deceleration patterns based on reality can be provided.

CONTROL STANDARD VALUE

Description will then be given of setting of a control reference value for comparison with ayhmax. As described above, to make a stable turn in driving through a curve, ayhmax must be limited to a sufficiently small value in accordance with the $\mu$ of the road surface. For example, in designing ordinary roads, ayhmax is limited to about 1.7–2 m/s$^2$.

In this embodiment, the control reference value is set taking the following two factors, F1 and F2 into consideration.

Items Stored in Map Data Base 14

An ineptitude flag F1 is provided through comprehensive evaluation of the road width, the clear visibility of the road ahead, the unevenness of the road surface, the degree of pavement, and so on. Related data is collected from various points of the roads and stored in the map data base 14. When the conditions are good, F1=0 is set, and when the conditions are bad, F1=1 is set. Instead of evaluation of two stages described above, evaluation in multiple stages may be adopted.

Items Detected on the Vehicle Side

In this embodiment, a flag F2 is set according to the dampness of the road surface detected by the ineptitude sensor 18. This is because the friction coefficient $\mu$ of the road surface varies greatly according to the dampness of the road surface. Preferably, the setting of the ineptitude flag is changed not only according to the dry or wet condition of the road but also according to snow, ice and so on. Information about the tires may be detected. F2=0 is set when the condition is good, and F2=1 is set when the road condition is bad. For this flag, too, evaluation may be in multiple stages instead of two stages.

Friction Coefficient $\mu$ of Road Surface

With regard to the friction coefficient $\mu$, if data on the roads when they are wet or dry are stored in the map data base 14, a value may be selected which corresponds to a signal from the ineptitude sensor 18. Instead of storing the friction coefficients $\mu$ for each road, a table may be prepared which holds values decided by taking the paved condition of the road into consideration, to take an example, certain values are assigned to an asphalt road considering whether the road is dry or wet, so that the friction coefficient $\mu$ is decided based on the paved condition of the road (stored in the map data base 14). Alternatively, the values of friction coefficient $\mu$ of the road on which the vehicle is traveling may be transmitted from the beacons on the road so that the driver can see the friction coefficient $\mu$ of the road by receiving a signal using communication equipment on the vehicle. The friction coefficient $\mu$ may be estimated from stored data on the behavior of the vehicle, such as skidding at the time of braking or acceleration in the past. Or, the friction coefficient $\mu$ may be estimated from the self-aligning torque (the torque acting on the ground contact area of the tire in the direction of reducing the slip angle when the tire is rotating with a certain slip angle).

If an accurate value of the friction coefficient $\mu$ of the road surface is obtained, it becomes unnecessary to pay attention to the state of the ineptitude flag related to the friction coefficient $\mu$ of the road surface.

Setting the Control Reference Value

If the flags F1 and F2 were decided as described above, a flag F3 is decided by a combination of those flags.

TABLE 1

Definition of flag F3

|    | F2 |   |
|----|----|---|
| F1 | 0  | 1 |
| 0  | 0  | 2 |
| 1  | 1  | 3 |

The flag F3 is provided for numerical representation of the ineptitude by combining the two flags described earlier. The flag F3 is assigned a value of 0, 1, 2 or 3 as four combinations of states of flags F1 and F2.

By using the values of the flag F3, the value of control reference value ayhmax for lateral acceleration is varied. For example, when setting three parameters a1, a2, and a3 as control reference values for a deceleration insufficient warning, those parameters are varied according to the value of F3 to provide control reference values a1*, a2*, and a3*. The * indicates the value of the flag F3. For example, F3=1 when F1=1 and F2=0, and 1 is substituted for *, so that the reference values become a11, a21, and a31. In this way, the control reference values are varied according to the environmental conditions of the road and the vehicle.

Figure 8:
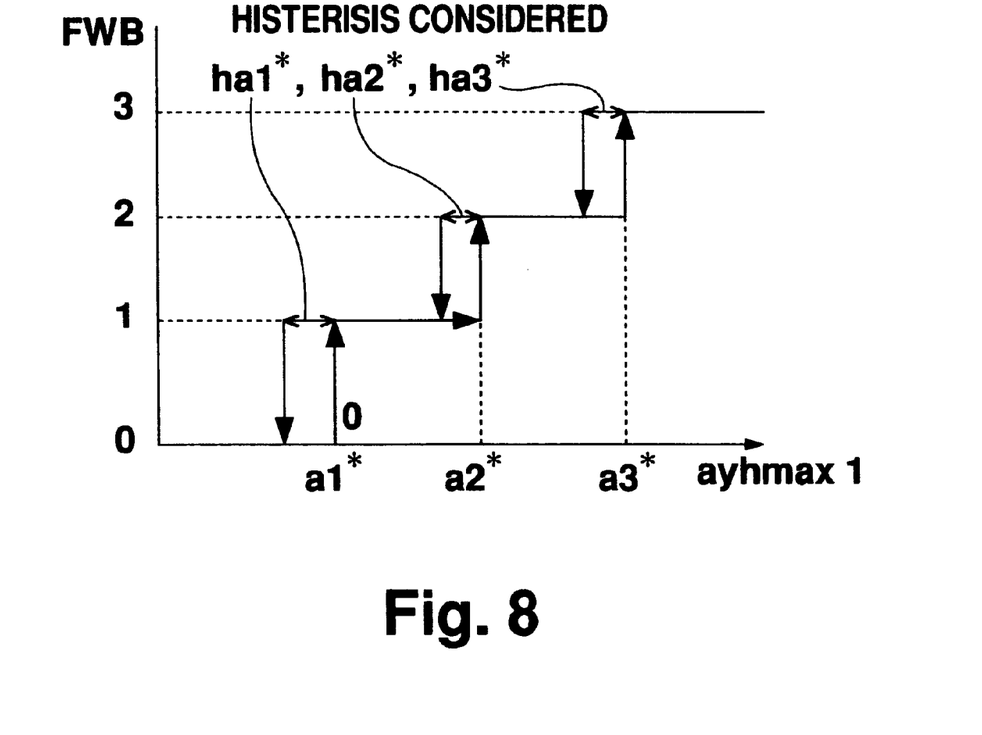
FIG. 8 is an explanatory diagram of a plurality of control reference values.

In the above operation, considering hysterisis, the three control reference values a1*, a2*, and a3* are differentiated in the increasing and decreasing directions as shown in FIG. 8. In other words, hysterises h1*, h2* and h3* are set to correspond to the control reference values a1*, a2* and a3*. By this setting, hunting in control equipment is prevented.

Figure 9:
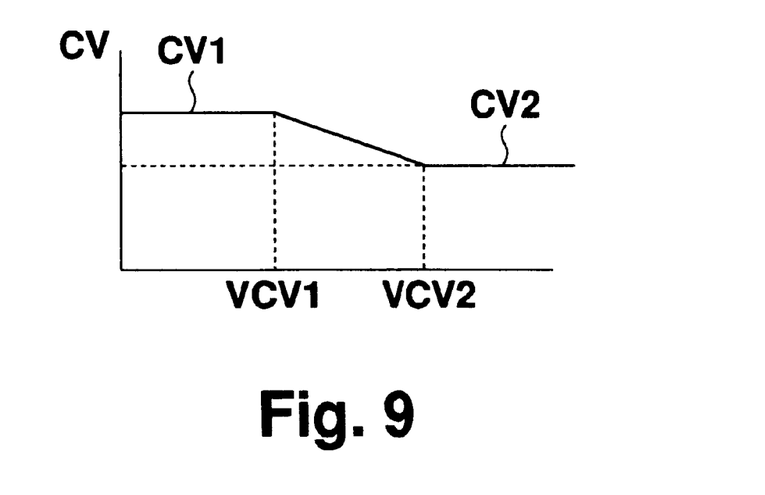
FIG. 9 is an explanatory diagram of an example of a weighting function.

As shown in FIG. 9, it is preferred that the control standard values are multiplied in advance by weighting functions CV (V) (less than 1). In FIG. 9, the weighting functions are as follows: CV1 up to vehicle speed VCV1, CV2 (smaller than CV1) from vehicle speed VCV2 and higher, and CV values decreasing linearly from CV1 to CV2 for vehicle speeds from VCV1 to VCV2. By this arrangement, the control reference value is decreased as the vehicle speed increases, and the decreased value may be used as the final control reference value. This is done to provide a large allowance in consideration of the fact that at a higher vehicle speed, the variation in the lateral acceleration becomes large, which is caused by a slight change in the conditions, such as in the driving action.

WARNING DECISION AND CONTROL

Description will next be made of decision of warning output. This decision is made according to whether or not ayhmax obtained by estimation mentioned above exceeds the control reference value set as described above. In the example in FIG. 8, FWB=0 when ayhmax is a1* or less, FWB=1 when ayhmax is greater than a1*, FWB=2 when ayhmax is a2*, and FWB=3 when ayhmax is greater than a3*. By deciding the content of a warning according to the value of this flag FWB, a warning can be generated which corresponds to the instability in driving through a curve.

For example, possible kinds of warnings that can be given according to the value of the flag FWB are as follows.

FWB=0: Nothing is done.

FWB=1: primary warning by voice (only once)

FWB=2: secondary warning by voice ("Apply the brake" together with a buzzer sound)

FWB=3: third warning by voice (the same content as in the secondary warning with greater sound volume)

It is preferable that the warning is output by (i) warning by voice, (ii) buzzer, or (iii) turning on a lamp or LED, or a combination. It is also preferred that any plural n control reference values are provided and various warning means are combined.

Furthermore, deceleration control is preferably carried out by a combination of the following items of control. For example, deceleration control should be done when FWB=2 or 3.

(i) Throttle control (The throttle is closed for deceleration.)

(ii) Gear shift down in automatic transmission (AT) on a downhill slope (An abrupt shift down causes a sharp change in the tire slip ratio which is responsible for unstable behavior of the vehicle. Such deceleration control as absorbing the shock in gear change and stepless speed change is effective.

(iii) Control of brake pressure of front and rear wheels (In this case, automatic vehicle speed control by brake pressure is performed, regardless of whether or not the driver operates the brake.)

Desired deceleration control can be carried out by the methods as described.

LATERAL ACCELERATION CALCULATION FOR ADVANCE WARNING

In this embodiment, in addition to control by a warning just before entering a curve when deceleration is insufficient, an advance warning to urge the driver to slow down, which precedes a warning about forced deceleration by automatic control, is given a considerable distance before the curve under slightly simpler conditions.

In this case, the lateral acceleration is calculated as stated below, and output of a warning is controlled by comparing the calculated acceleration with the control reference value.

The curvature roumax whose absolute value is greatest in a specific road division in front of the vehicle (for a time from tpmin sec to tpmax sec or a distance from tpmin×V to tpmax×V) and also the cantmax at that point on the road are obtained from data supplied from the map data base 14. A possible road division is a distance corresponding to about 2 to 9 sec., for example.

As the assumed deceleration pattern, a pattern as shown below used. Specifically, the curve passing speed is assumed as $$Vp = (Fpv \times V) + (1 - Fpv \times Vc/3.6) \times Kv$$

where Fpv is a weighting function, and Fpv=1 if Fpv is assumed to be the present speed, and Fpv=0 if it is assumed that the vehicle passes the curve at the speed limit of that course, Vc is the speed limit (km/h) of the course, and Kv is a correction factor.

On the other hand, the lateral acceleration while turning, ayp, is expresses as $$ayp = roumax \times Vp^2 - g \times cantmax$$

This equation also takes the turning direction (to left or right) into consideration.

For example, if Vc=50 km/h at Fpv=0.5 and Kv=1.0, when the vehicle is driving at a speed of 70 km/h, it follows that an assumption is made that the vehicle will enter the curve at a vehicle speed corresponding to Vp=60 km/h. With respect to this condition, a lateral acceleration is estimated and a warning is issued.

As described above, in this example, the passing speed in a curve ahead (Vp) is estimated from the speed limit (Vc) and the present vehicle speed (V), respectively weighted by a weighting function (Fpv). The drivers are normally aware of the speed limit of the road on which they drive, and are considered to drive bearing in mind the speed limit as the reference. By basing driving on the speed limit as the reference, the prediction of the vehicle speed becomes consistent with reality, so that a warning becomes suitable. Not only the speed limits but also various kinds of recommended speeds may be adopted. For example, it is preferred that recommended speeds are decided considering curves, and stored and used in place of the official speed limits.

The thus calculated lateral acceleration ayp is compared with the control reference value ap1*. This control reference value ap1* is decided in the same way as mentioned above, and is set at the same value with the first reference value a1* mentioned above. The * represents the value of F3, so that ap1* is varied by the value of the flag F3.

Figure 10:
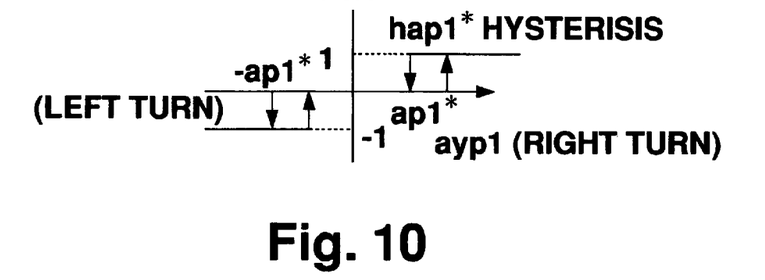
FIG. 10 is an explanatory diagram of control reference values.

As shown in FIG. 10, the control reference value ap1* can have two values ap1* and -ap1* having the positive and negative signs. When ayp is larger than ap1*, the flag FWP=1, and when ayp is smaller than -ap1*, the flag FWP=-1. When FWP=1, a voice message "Take care the road turns right." is given, and when FWP=-1, a voice message "Take care, the road turns left." Also in this case, hysterises hap1* are taken into account as shown in FIG. 10, for accurate decision with respect to warning.

DATA INPUT

For the above operation, data in the map data base 14 is prepared

TABLE 2

| POSITION | CURVATURE | CANT | LONGL. SLOPE | INEPTITUDE FLAG |
|---|---|---|---|---|
| P0 (x0, y0) | rou 0 | cant 0 | inc 0 | flag 0 |
| P1 (x1, y1) | rou 1 | cant 1 | inc 1 | flag 1 |
| P2 (x2, y2) | rou 2 | cant 2 | inc 2 | flag 2 |
| P3 (x3, y3) | rou 3 | cant 3 | inc 3 | flag 3 |
| Pn (xn, yn) | rou n | cant n | inc n | flag n |

TABLE 3

| POSITION | DISTANCE TO THE PREVIOUS POINT | DISTANCE FROM P0 | CURVATURE | CANT | LONGL. SLOPE | INEPTITUDE FLAG |
|---|---|---|---|---|---|---|
| P0 (x0, y0) |  | s0 | rou 0 | cant 0 | inc 0 | flag 0 |
| Pp (xp, yp) | dp | sp |  |  |  |  |
| P1 (x1, y1) | d1 | s1 | rou 1 | cant 1 | inc 1 | flag 1 |
| P2 (x2, y2) | d2 | s2 | rou 2 | cant 2 | inc 2 | flag 2 |
| P3 (x3, y3) | d3 | s3 | rou 3 | cant 3 | inc 3 | flag 3 |
| Pn (xn, yn) | dn | sn | rou n | cant n | inc n | flag n |

TABLE 3-continued

| POSITION | DISTANCE TO THE PREVIOUS POINT | DISTANCE FROM P0 | CURVATURE | CANT | LONGL. SLOPE | INEPTITUDE FLAG |
| --- | --- | --- | --- | --- | --- | --- |

Figure 11:
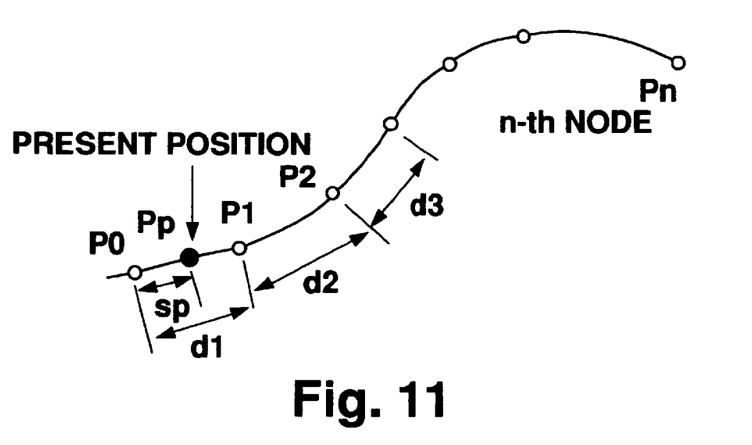
FIG. 11 is an explanatory diagram of points on a map.

The cant is + when the cant is left-side down, the curvature is + for a left-turn curve, and the longitudinal slope is + when the slope is uphill.

for specified points on the roads. For example, various items of data are stored for different points, such as P1, P2, P3, . . . spaced apart for specified distances (not necessarily at the same intervals) as shown in FIG. 11.

When data is read from the map data base 14 according to the map data base 14, reading starts with data at point P0 immediately before the present position at that moment. Data read from the map data base 14 contains the position, curvature, cant, longitudinal slope, and ineptitude flag at each point as shown in Table 2.

The processing unit 10, on reading data, calculates the distance d from each point to each previous point, and the distance s from each point to the P0 which immediately before the present position and stores these data. Furthermore, the distance from the present position is stored as dp and sp.

Figure 12:
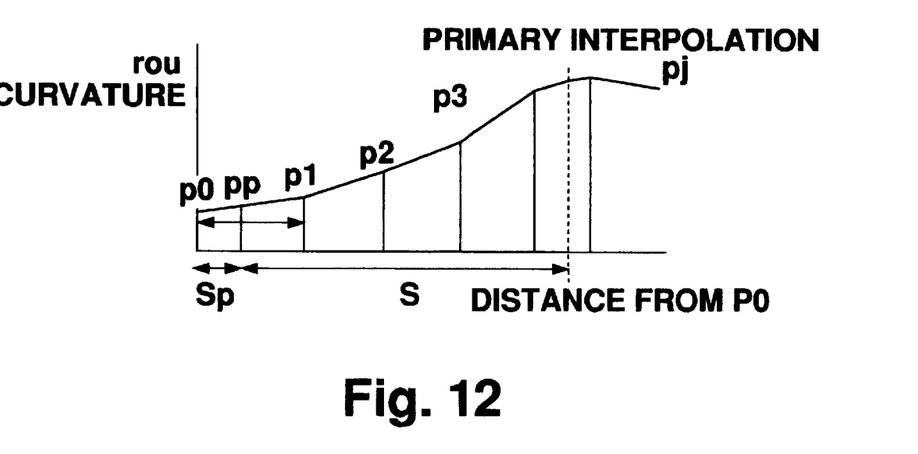
FIG. 12 is an explanatory diagram showing interpolation of data.

Table 3 is stored, and therefore data in this map can be used to calculate the lateral acceleration for various points ahead of the vehicle, making high-speed calculation possible. Rewriting data in the map as the vehicle moves on can be done relatively easily. Data for a position between points (the map points) may be prepared by linear interpolation. To be more specific, as shown in FIG. 12, data for a position between points can be interpolated from data at the preceding and succeeding points. FIG. 12 indicates how curvature data is calculated.

FRICTION COEFFICIENTS $\mu$ ON THE ROAD SURFACE

The friction coefficient $\mu$ of the road surface expressed in terms of values of wet and dry roads may be stored for various points along the roads in the map data base 14. In this case, an arrangement may be made so that by detecting whether the road is wet or dry from the on/off condition of the wiper, a suitable friction coefficient $\mu$ is selected, by which a relatively accurate friction coefficient $\mu$ can be obtained.

Instead of storing the friction coefficient $\mu$ of each road, a table may be prepared in which the predetermined values are set according to whether the road is dry or wet and also according to the kind of the road, an asphalt road, for example, so that the friction coefficient $\mu$ is decided in consideration of the paved condition of the road (stored in the map data base 14). Moreover, the values of the friction coefficient $\mu$ of the road, on which the vehicle is driving, may be transmitted from the beacons along the road so that the driver can see the friction coefficient $\mu$ of the road by receiving a signal using communication equipment on the vehicle.

Furthermore, the friction coefficient $\mu$ of the road may be estimated from data on the behavior of the vehicle, such as skidding which occurred at the time of braking or acceleration in the past. The friction coefficient $\mu$ of the road may be estimated from the self aligning torque (the torque acting on the ground contact area of the tire in the direction of reducing the slip angle when the tire is rotating at a slip angle).

If an accurate value of the friction coefficient $\mu$ of the road surface is obtained by these techniques, it becomes unnecessary to pay attention to the state of the ineptitude flag related to the friction coefficient $\mu$ of the road surface.

Incidentally, the processing unit 10 is constituted by a computer including a CPU, RAM and ROM, and so on. Normally, the operations described above are achieved by executing an operation program stored in ROM. It is also preferable to store an operation program in an external recording medium, such as the map data base 14, and to install this program in the processing unit 14. In this case, an EEPROM which permits data to be rewritten may be adopted to record the operation program.

What is claimed is:

1. A device for predicting a lateral acceleration of a vehicle in an upcoming curve, comprising:

a detector which detects a current acceleration or deceleration of the vehicle, wherein a vehicle speed upon entering a curve is predicted according to a predetermined acceleration/deceleration pattern, the predetermined acceleration/deceleration pattern determined based on the current acceleration/deceleration of the vehicle and said lateral acceleration is predicted according to said predicted vehicle speed.

2. A vehicle driving condition prediction device according to claim 1, wherein said predetermined acceleration/deceleration pattern takes a present driving condition into consideration.

3. A vehicle driving condition prediction device according to claim 2, wherein said acceleration/deceleration pattern takes said present driving condition into consideration for a predetermined condition maintaining period of time.

4. A vehicle driving condition prediction device according to claim 1, wherein said acceleration/deceleration pattern is such that said present driving condition is maintained for said predetermined period of time, and thereafter the vehicle speed is slowed down at a predetermined deceleration.

5. A vehicle driving condition prediction device according to claim 1, said predetermined acceleration/deceleration pattern takes a longitudinal slope into consideration.

6. A vehicle driving condition prediction device according to claim 5, wherein said acceleration/deceleration pattern is such that said present acceleration/deceleration is maintained for a predetermined period of time, and the vehicle speed is slowed down at a predetermined deceleration, said predetermined deceleration taking said longitudinal slope of the road into consideration.

7. A vehicle driving condition prediction device according to claim 6, wherein said predetermined deceleration has the fixed deceleration varied according to said longitudinal slope of the road.

8. A vehicle driving condition prediction device according to claim 1, wherein said predetermined acceleration/deceleration pattern takes a speed limit of the road on which the vehicle is running into consideration.

9. A vehicle driving condition prediction device according to claim 1, further comprising a data base containing data on curvatures of curves and data on longitudinal slopes of roads, wherein said lateral acceleration is predicted from both a curvature of a curve and a longitudinal slope of a road.

10. A warning device for predicting a lateral acceleration of a vehicle in an upcoming curve and producing a warning according to a predicted lateral acceleration, comprising:

a vehicle speed predicting device that predicts a vehicle speed as a vehicle approaches an upcoming curve according to a predetermined acceleration/deceleration pattern; and a warning element, wherein a maximum lateral acceleration in a curve ahead is predicted according to the predicted vehicle speed, and wherein if said predicted maximum lateral acceleration is higher than a predetermined lateral acceleration, a warning is issued.

11. A warning device according to claim 10, further comprising:

a data base containing data on curvatures of curves and data on cants of roads, wherein said lateral acceleration is predicted from both a curvature of a curve and a cant of a road.

12. A device for predicting a lateral acceleration of a vehicle when passing through an upcoming curve, comprising:

a detector which detects a current acceleration/deceleration of the vehicle, wherein a vehicle speed upon entering the upcoming curve is predicted according to a predetermined acceleration/deceleration pattern, said predetermined acceleration/deceleration pattern including a first phase of maintaining the current state during a first predetermined period and a second phase of deceleration, and said lateral acceleration is predicted according to the predicted vehicle speed.

* * * * *